US008924546B1

(12) United States Patent
Liao et al.

(10) Patent No.: US 8,924,546 B1
(45) Date of Patent: Dec. 30, 2014

(54) ROAMING BANDWIDTH GUIDANCE FOR MOBILE COMPUTING DEVICES

(75) Inventors: Shu-Ying Liao, Taipei (TW); Peng-Shih Pu, Taipei (TW); Shr-An Su, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 135 days.

(21) Appl. No.: 13/425,638

(22) Filed: Mar. 21, 2012

(51) Int. Cl.
*G06F 15/173* (2006.01)
(52) U.S. Cl.
USPC .......................................... 709/224; 709/223
(58) Field of Classification Search
USPC ................................................. 709/223–224
See application file for complete search history.

(56) References Cited

U.S. PATENT DOCUMENTS

| | | | |
|---|---|---|---|
| 6,556,817 B1* | 4/2003 | Souissi et al. ................. | 455/406 |
| 6,987,987 B1* | 1/2006 | Vacanti et al. ............. | 455/556.2 |
| 8,112,063 B2 | 2/2012 | Kankar et al. | |
| 8,116,764 B2 | 2/2012 | Moore et al. | |
| 8,116,765 B2 | 2/2012 | Xue et al. | |
| 8,117,340 B2 | 2/2012 | Williams et al. | |
| 8,121,594 B2 | 2/2012 | Jiang | |
| 8,126,455 B2 | 2/2012 | Hu et al. | |
| 8,126,458 B2 | 2/2012 | Zhu | |
| 8,130,725 B2 | 3/2012 | Chen | |
| 8,130,760 B2 | 3/2012 | Xu et al. | |
| 8,131,283 B1 | 3/2012 | Vargantwar et al. | |
| 8,131,290 B2 | 3/2012 | Lamba et al. | |
| 8,234,373 B1* | 7/2012 | Ulvenes ........................ | 709/225 |
| 2003/0114138 A1* | 6/2003 | Ramaswamy et al. ........ | 455/403 |
| 2003/0164702 A1 | 9/2003 | Bechtold et al. | |
| 2003/0187806 A1* | 10/2003 | Banerjee et al. ............. | 705/400 |
| 2005/0164702 A1 | 7/2005 | Carlson et al. | |
| 2008/0089295 A1* | 4/2008 | Keeler et al. .................. | 370/332 |
| 2008/0275984 A1* | 11/2008 | Ullmann et al. ............. | 709/224 |
| 2009/0088188 A1* | 4/2009 | Wormald et al. ............. | 455/466 |
| 2009/0089192 A1* | 4/2009 | Ferlitsch ......................... | 705/33 |

OTHER PUBLICATIONS

Roaming—From Wikipedia, the free encyclopedia, 7 sheets [retrieved on Mar. 16, 2012], retrieved from the internet: http://en.wikipedia.org/wiki/Roaming.
Uniform resource identifier—From Wikipedia, the free encyclopedia, 8 sheets [retrieved on Mar. 12, 2012], retrieved from the internet: http://en.wikipedia.org/wiki/Uniform_resource_identifier.
Freeware symbian—PBC-Eurotariff 1 free download for Symbian s60 3rd and 5th edition, 3 sheets [retrieved on Mar. 10, 2012], retrieved from the internet: http://www.symbian-freeware.com/download-pbc-eurotariff-1.html.
Personal—Estimate your Data Usage—International Roaming—Telstra, 2 sheets [retrieved on Mar. 10, 2012], retrieved from the internet: http://www.telstra.com.au/mobile-phones/international-roaming/estimate-data-usage-overseas/.

(Continued)

*Primary Examiner* — Waseem Ashraf
(74) *Attorney, Agent, or Firm* — Okamoto & Benedicto LLP

(57) ABSTRACT

A mobile computing device includes a roaming bandwidth advisor for determining size information of web data (e.g., webpage, streaming media) before the web data is received in the mobile computing device. The mobile computing device may cooperatively work with a cloud computing system to obtain size information of the web data. Roaming fee information (e.g., the size of the web data and/or associated roaming fee) for receiving the web data is displayed on the mobile computing device before a request for the web data is sent out of the mobile computing device.

16 Claims, 7 Drawing Sheets

(56) References Cited

OTHER PUBLICATIONS

AppBrain—SingTel Roam Track fro Android / AppBrain.com, 2 sheets [retrieved on Mar. 10, 2012], retrieved from the internet: http://www.appbrain.com/app/singtel-roam-track/com.prrm.roamingtrack.

iPhoneTrip—Travel internationally with 3G data SIM cards and avoid internet roaming charges, 2 sheets [retrieved on Mar. 12, 2012], retrieved from the internet: http://www.iphonetrip.com/.

* cited by examiner

US 8,924,546 B1

ROAMING BANDWIDTH GUIDANCE FOR MOBILE COMPUTING DEVICES

BACKGROUND OF THE INVENTION

1. Field of the Invention

The present invention relates generally to mobile computing devices, and more particularly but not exclusively to mobile computing devices that are subject to roaming fees.

2. Description of the Background Art

Mobile computing devices, such as smart phones and portable computers (e.g., laptops, tablets), may be employed on the go and away from their usual geographic location. For example, business travelers or vacationers may employ their mobile phones (e.g., smart phones) abroad or in some other location where their wireless carrier charges a roaming fee. Roaming fees are based on network bandwidth consumption, can be quite high, and may come as a surprise to some users. Given the data size of available web data, such as webpages, streaming media, on-line games, etc., available on the Internet, it is relatively easy to inadvertently consume large bandwidth, and accordingly incur a large roaming fee, when using a mobile computing device in roaming mode.

Various approaches have been tried to alleviate surprises relating to roaming fees. One approach is to send a warning message to users that have accumulated an exorbitant amount of roaming fees. Another approach is to allow users to set a limit on bandwidth consumption and be notified when the limit is reached. Yet another approach is to get a subscriber identity module (SIM) card with preset or unlimited wireless access abroad. Yet another approach is to estimate roaming fees based on information manually entered by the user into a stand-alone program in a single estimate session.

SUMMARY

In one embodiment, a computer-implemented method includes intercepting a uniform resource identifier (URI) request in a mobile computing device operating in roaming mode outside its home location, the URI request including a target URI that identifies target web data available over a computer network and outside of the mobile computing device. In response to receiving the URI request, network bandwidth consumption associated with receiving the target web data in the mobile computing device is determined. Before sending the URI request out of the mobile computing device, roaming fee information (e.g., size of the target web data and/or associated roaming fee) for receiving the target web data into the mobile computing device is displayed on a screen of the mobile computing device.

In another embodiment, a system comprises a mobile computing device configured to operate in roaming mode outside its home location, the mobile computing device being configured to send an in-the-cloud size query to a cloud computing system to determine a size of a target web data identified by a uniform resource identifier (URI) that is included in a URI request, the mobile computing device being configured to hold the URI request at least until after receiving a result of the in-the-cloud size query from the cloud computing system. The system further comprise the cloud computing system configured to receive the in-the-cloud size query from the mobile computing device and to provide the result of the in-the-cloud query to the mobile computing device, the result indicating a size of the target web data.

In another embodiment, a computer-implemented method includes intercepting a request for a webpage in a mobile computing device. In response to receiving the request for the webpage, a size of the webpage is determined. Before sending the request for the webpage out of the mobile computing device, information relating to a fee for receiving the webpage in the mobile computing device is displayed on a screen of the mobile computing device, the information relating to the fee being based on the size of the webpage.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
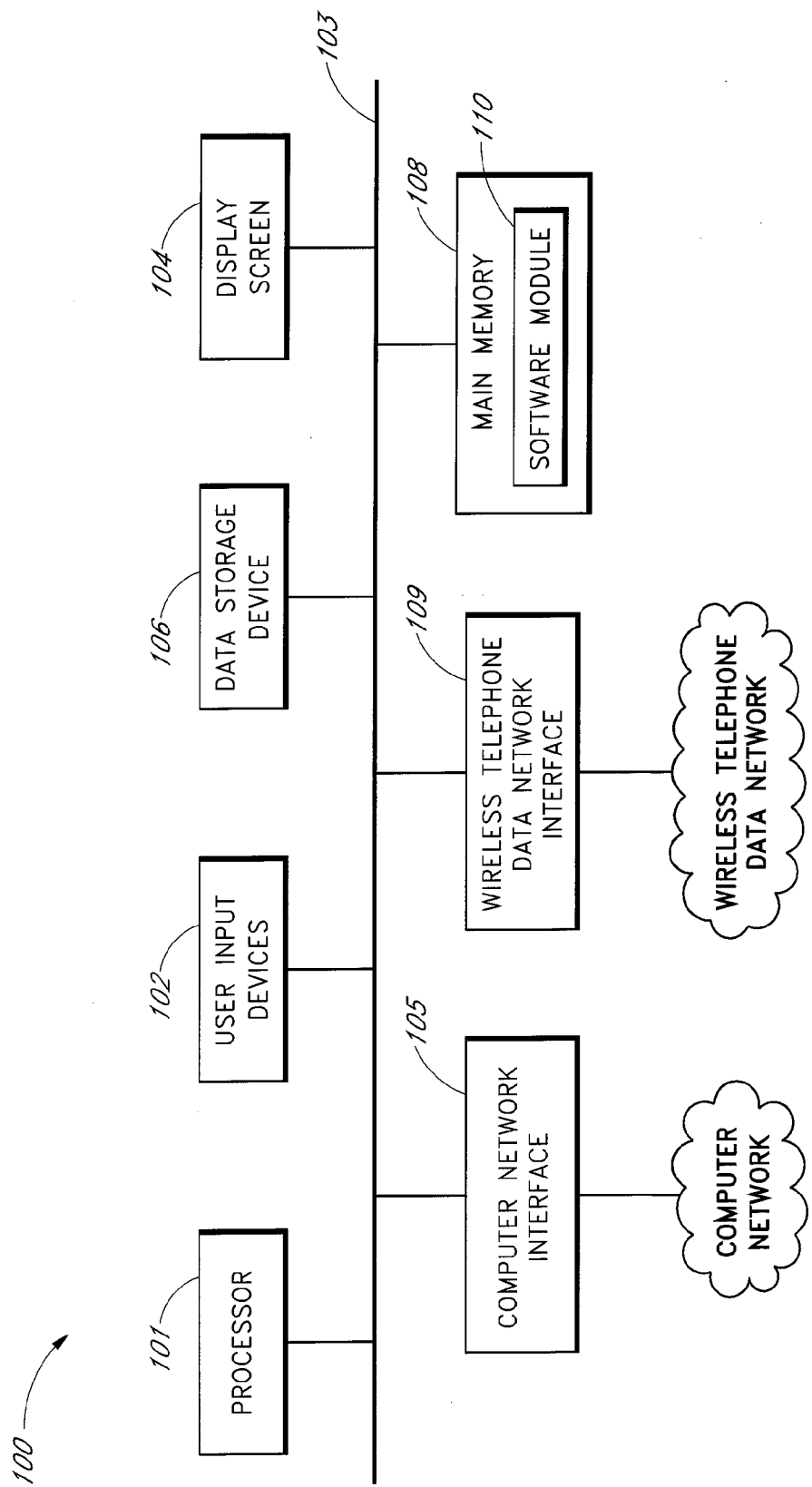
FIG. 1 shows a schematic diagram of a computer that may be employed with embodiments of the present invention.

Referring now to FIG. 1, there is shown a schematic diagram of a computer 100 that may be employed with embodiments of the present invention. The computer 100 may be employed as any of the computing devices described below. The computer 100 may include a processor 101. The computer 100 may have one or more buses 103 coupling its various components. The computer 100 may include one or more user input devices 102 (e.g., keyboard, mouse), one or more data storage devices 106 (e.g., hard drive, optical disk, USB memory), a display screen 104 (e.g., LCD, flat panel), a computer network interface 105 (e.g., Ethernet network adapter, Wi-Fi adapter), and a main memory 108 (e.g., RAM). The computer network interface 105 may be coupled to a computer network, which in this example includes the Internet. As an example, the computer network interface 105 may comprise a wireless computer network interface to allow the computer 100 to operate in Wi-Fi mode.

The computer 100 may have fewer or more components to meet the needs of a particular application. For example, the computer 100 may include a wireless telephone data network interface 109, such as a SIM card interface, when employed as a mobile computing device. The wireless telephone data network interface 109 allows the computer 100 to send and receive data over a wireless telephone data network, such as a 3G or 4G network.

The computer 100 is a particular machine as programmed with software modules 110. The software modules 110 comprise computer-readable program code stored non-transitory in the main memory 108 for execution by the processor 101.

The computer 100 may be configured to perform its functions by executing the software modules 110. The software modules 110 may be loaded from the data storage device 106 to the main memory 108. The software modules 110 may also be made available on other computer-readable storage medium including flash memory, micro SD, and other memory devices.

Figure 2:
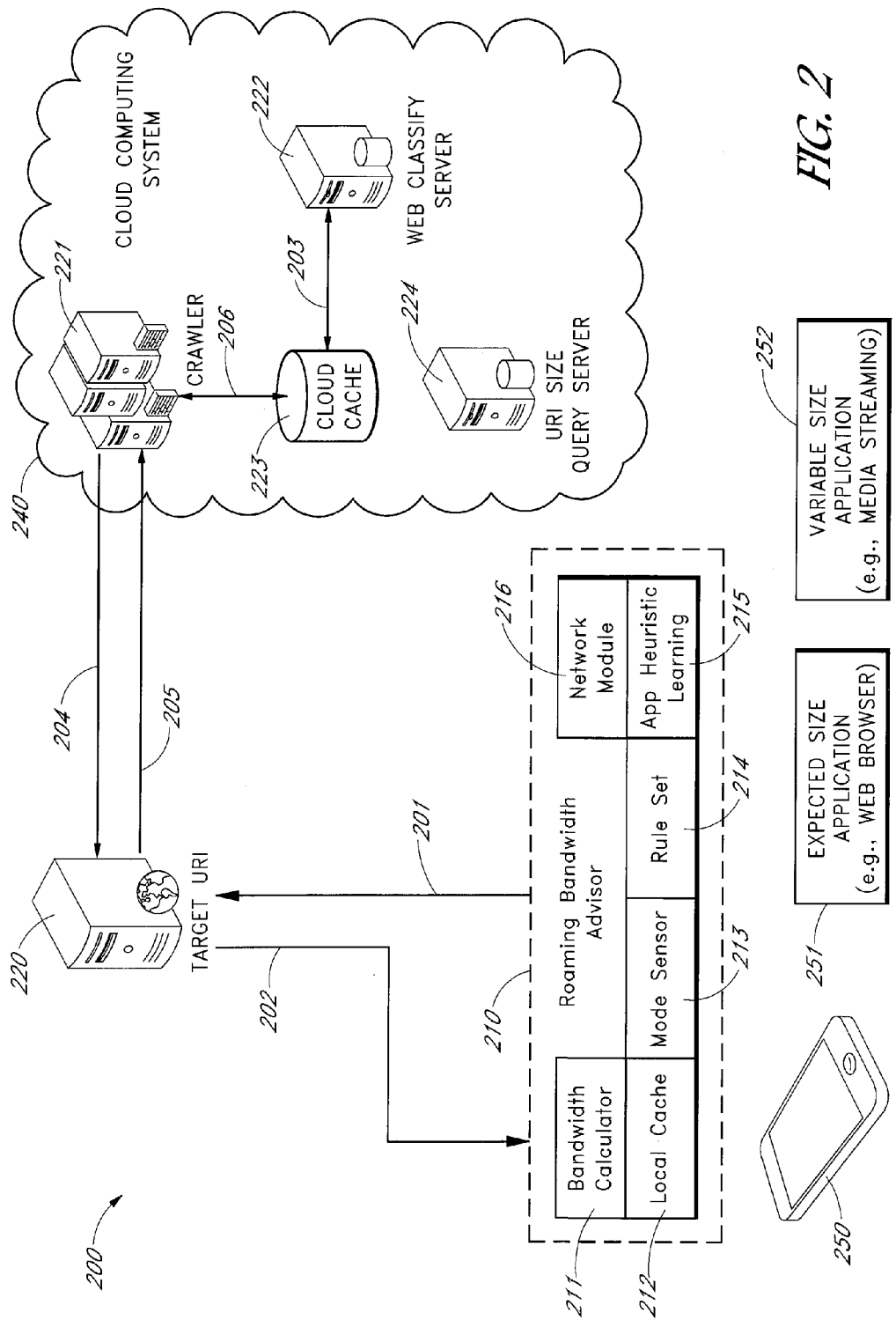
FIGS. 2 and 3 show a system for providing roaming bandwidth guidance for mobile computing devices in accordance with an embodiment of the present invention.
Figure 3:
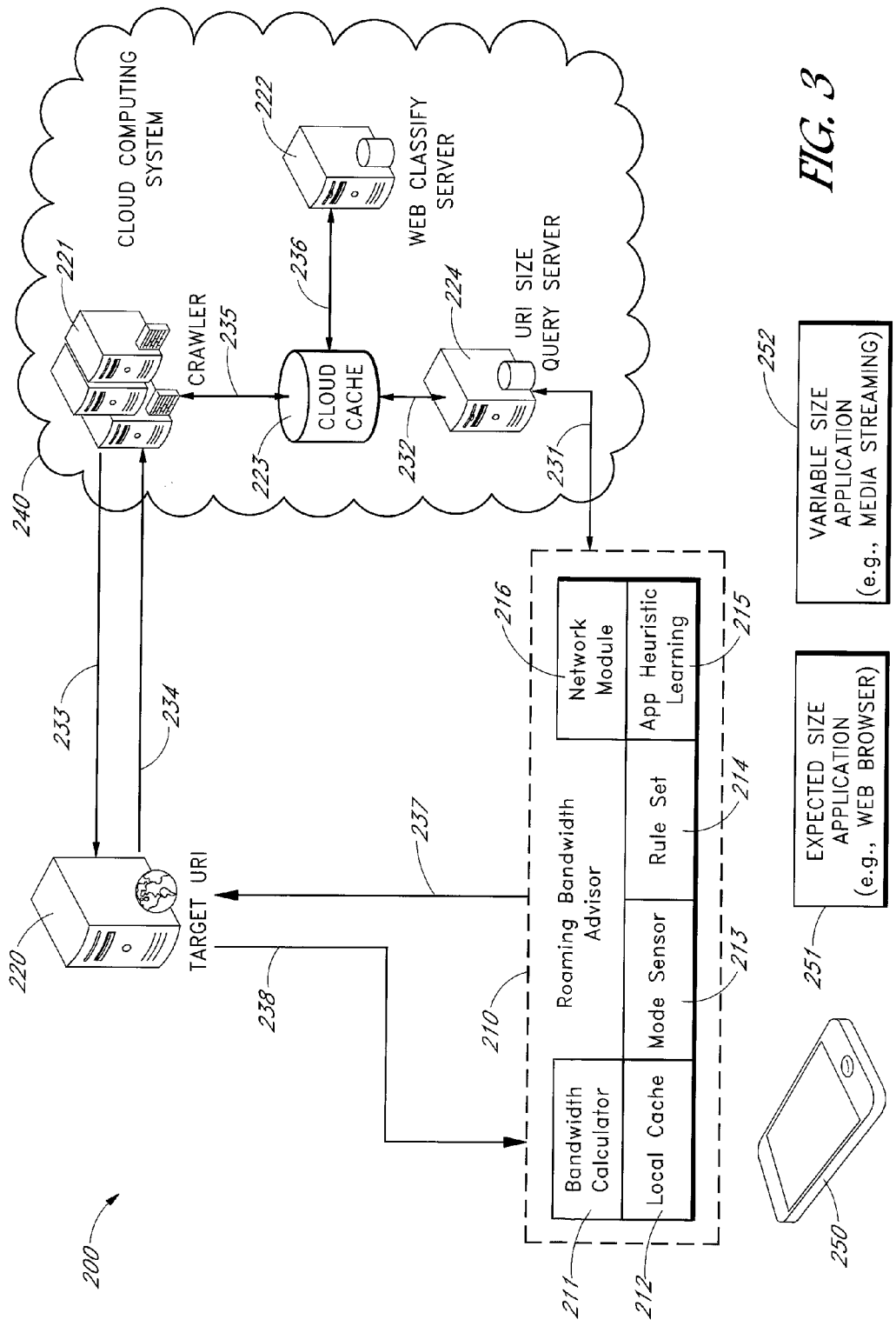

FIGS. 2 and 3 show a system 200 for providing roaming bandwidth guidance for mobile computing devices in accordance with an embodiment of the present invention. In one embodiment, the system 200 includes a cloud computing system 240 and a mobile computing device 250. The mobile computing device 250 is depicted as a mobile phone (e.g., smart phone) for illustration purposes only. In general, the mobile computing device 250 may comprise a mobile phone, a portable computer (e.g., laptop computer, tablet), or other mobile computing device that connects to a wireless telephone data network (e.g., cellular, 3G/4G) made available by a wireless carrier. Examples of wireless carriers that provide connectivity to a wireless telephone data network in the United States include AT&T, VERIZON WIRELESS, SPRINT, and T-MOBILE wireless carriers. Wireless service provided by a wireless carrier may be employed to send and receive web data to and from the Internet over a wireless telephone data network.

A wireless carrier typically charges a roaming fee for accessing web data over a wireless telephone data network in a geographic location that is outside a home location where the wireless service is registered. Roaming fees are charged for data access over the wireless telephone data network outside the home location. A mobile computing device outside its home location and accessing web data over a wireless telephone data network is referred to as operating in "roaming mode."

Most mobile computing devices with connectivity to a wireless telephone data network also have connectivity to a wireless computer network. In particular, a mobile computing device may also send and receive web data to and from the Internet over a wireless computer network, such as over a Wi-Fi network. A mobile computing device accessing data over a wireless computer network is referred to as operating in "unlimited data plan mode" as it typically does not incur roaming fees regardless of the location of the mobile computing device. Accessing data over a wireless computer network is also referred to as operating in "Wi-Fi mode" as Wi-Fi is currently the most popular wireless computer network.

Connectivity to a wireless computer network may be provided by commercial establishments (e.g., coffee shop HOTSPOT), residential wireless computer network, etc. Data access over a wireless computer network is typically free or at relatively low cost compared to roaming fees. However, a wireless computer network is not always available whereas connection to a wireless telephone data network is typically available wherever there is wireless telephone service. Therefore, a mobile computing device outside its home location may have to access web data in roaming mode.

The mobile computing device 250 may access web data by connecting to the uniform resource identifier (URI) of the web data. In the example of FIG. 2, the mobile computing device 250 may access web data stored in a computer 220 by connecting to the URI of the web data. The URI that is the target of a URI request is referred to as a "target URI" and the web data identified by the target URI is referred to as the "target web data." The target URI may be the uniform resource locator (URL) of the target web data, for example. Examples of web data include webpages, streaming media (e.g., video, online game), and other data accessible over a computer network, such as the Internet. As a particular example, the target URI may be a URL of a webpage served by a website hosted on the computer 220.

In one embodiment, the mobile computing device 250 includes a roaming bandwidth advisor 210. The roaming bandwidth advisor 210 may comprise computer-readable program code for providing guidance to the user whether or not to access web data over a wireless telephone data network. In one embodiment, the roaming bandwidth advisor 210 is configured to learn the network bandwidth consumption usage of a user in unlimited data plan mode, consult the cloud computing system 240 or locally available datastore (e.g., local cache 212) for information on the size of web data about to be downloaded to the mobile computing device 250 in roaming mode, and inform the user of roaming fee information before the web data is downloaded to the mobile computing device 250 in roaming mode. The roaming fee information may comprise size of the web data, roaming fee for receiving the web data in the mobile computing device 250, or both. In one embodiment, the roaming bandwidth advisor 210 comprises a bandwidth calculator 211, the local cache 212, a mode sensor 213, a URI query rule set 214, an application heuristic learning module 215, and a network module 216.

The bandwidth calculator 211 may be configured to calculate the size of downloaded web data. In one embodiment, the bandwidth calculator 211 calculates the size of a webpage received in the mobile computing device 250.

The local cache 212 provides a local datastore for the mobile computing device 250. In one embodiment, the local cache 212 stores size information of previously known web data. Size information stored in the local cache 212 may be from calculations previously performed by the bandwidth calculator 211 or from the cloud computing system 240 (e.g., from the cloud cache 223). Entries of size information in the local cache 212 may be identified by the URI of corresponding web data and may include a time-to-live (TTL) set in the URI query rule set 214.

The mode sensor 213 may be configured to indicate whether the mobile computing device 250 is operating in unlimited data plan mode or roaming mode. The operating mode (i.e., unlimited data plan mode or roaming mode) of the mobile computing device 250 may be manually entered into the mode sensor 213. The mode sensor 213 may also be configured to automatically detect the operating mode of the mobile computing device 250.

The URI query rule set 214 may be configured to store rules for determining the size of target web data, i.e., the web data requested to be downloaded into the mobile computing device 250. The settings of the URI query rule set 214 may be entered by manual entry or by reading a file (e.g., from a computer of the cloud computing system 240) containing the settings.

In one embodiment, the URI query rule set 214 groups application programs ("applications") according to whether the size of web data requested by the application is expected or varies, e.g., depending on usage. Applications that download data with expected data size, such as a web browser, may be classified in the URI query rule set 214 as an "expected size" application. More particularly, a web browser in the mobile computing device 250 may be hooked to detect a webpage requested by the web browser. In general, a webpage has an expected data size. Applications that receive web data of varying size depending on usage, such as online video games or streaming media, may be classified in the URI query rule set 214 as a "variable size" application because the bandwidth consumed by these applications are not readily determined. As an example, a streaming media player may be classified in the URI query rule set 214 as a variable size application because it is not readily known how much bandwidth will be consumed by the user to watch videos etc. using the media player. As will be more apparent below, the size of web data for an expected size application may be directly calculated, obtained from a local cache 212, obtained from a cloud cache 223, or obtained by real time crawling. The size of web data for a variable size application may be predicted by heuristic means, such as by the application heuristic learning module 215.

The URI query rule set 214 may store a white list, a black list, or both to allow for relatively quick decisions on whether roaming bandwidth guidance is needed for particular URIs. For example, the URI query rule set 214 may include a white list of URIs that are always allowed, i.e., web data identified by a URI in the white list is always to be downloaded to the mobile computing device 250 regardless of the size of the web data. As another example, the URI query rule set 214 may include a black list of URIs that are always to be blocked. The URIs in the white and black lists may be URLs, for example. Size determination is not required for web data of a URI included in a white or black list.

The URI query rule set 214 may indicate the preferred size lookup strategy for determining the size of web data to be downloaded to the mobile computing device 250. The size lookup strategy may indicate whether to consult the local cache 212 only without sending an in-the-cloud size query to the cloud computing system 240, to consult the cloud cache 223 only, or to request a computer 221 with a crawler to perform real time crawling. The size lookup strategy selection may be provided as a checkbox that may be manually checked or unchecked by the user of the mobile computing device 250.

The URI query rule set 214 may indicate TTL or size limit of the local cache 214 to ensure freshness of size information stored in the local cache 214 while limiting the overall storage space consumption in the mobile computing device 250. Size information in the local cache 214 may be automatically flushed, i.e., removed, when its corresponding TTL expires. Size information in the local cache 214 may also be automatically flushed on a first in first out basis when the local cache size limit is exceeded.

The URI query rule set 214 may also indicate roaming fees. This allows for calculation of the cost, e.g., in U.S. dollars, associated with downloading web data in roaming mode. For example, assuming the roaming fee is $0.0195/KB and the target web data to be downloaded to the mobile computing device 250 is determined by the roaming bandwidth advisor 210 to be 1 MB, the roaming bandwidth advisor 210 may inform the user that the web data requested by the user will cost the user $20 ($0.0195×1024). This allows the user to make an informed decision as to whether to proceed with the download.

The application heuristic module 215 may be configured to predict network bandwidth that will be consumed by the mobile computing 250 to receive web data for a variable size application in the mobile computing device 250. The application heuristic module 215 may be configured to monitor and record bandwidth consumption associated with receiving web data for a particular variable size application and calculate statistical information of the bandwidth consumption. For example, the application heuristic module 215 may be configured to calculate the peak, mean, and standard deviation of web data downloaded to the mobile computing device 250 when watching video, playing a particular online video game, or using other applications where the size of the web data to be received is variable or not readily determined. Because the statistical information is based on actual usage, the statistical information provides a meaningful and reasonable prediction of network bandwidth consumption associated with receiving web data for a variable size application.

The network module 216 may be configured to intercept and hold a request for web data about to be sent from the mobile computing device 250. This gives the roaming bandwidth advisor 210 sufficient time to determine the size of the web data before actually allowing the web data to be downloaded to the mobile computing device 250. In one embodiment, the network module 216 is configured to hook a URI request and prevent the URI request from being sent out of the mobile computing device 250 to allow for determination of the size of the web data requested in the URI request before the URI request is sent out of the mobile computing device 250. The network module 216 may be configured to forward the URI request to the intended computer when the user wants to proceed with the download after being presented with roaming fee information, such as the size of the web data requested, associated roaming fee, or both.

The network module 216 may be configured to communicate with the cloud computing system 240 to consult the cloud cache 223 or ask for the services of a crawler to determine the size of data identified by a particular URI. In one embodiment, the network module 216 is configured to send an in-the-cloud size query to the cloud computing system 240 when the local cache 212 does not have size information on the requested web data and/or the URI query rule set 214 indicates that the preferred size lookup strategy is by consulting the cloud cache 223 or by real time crawling. The in-the-cloud size query may indicate the target URI, client region, system/browser location, and user agent information. The network module 216 may extract the user agent information and system/browser location from the network packet sent out by the requesting application, and insert the user agent information and system/browser location in the in-the-cloud size query. The client region may be obtained from the IP address of the mobile computing device 250. The in-the-cloud size query may also indicate the preferred size lookup strategy, such as by consulting the cloud cache 223 or having a crawler obtain and size the data identified by the URI. The in-the-cloud size query and corresponding response from cloud computing system 240 may be encrypted to protect the user's privacy. For reduced packet size and latency, the cloud computing system 240 and the mobile computing device 250 may communicate using a UDP protocol, such as DNS query.

In one embodiment, the cloud computing system 240 includes one or more computers 221 serving as crawlers, the cloud cache 223, a computer 222 serving as a web classify server, and a computer 224 serving as a URI size query server.

A computer 221 may include a web robot or crawler configured to retrieve target web data identified by a target URI. The computer 221 may be a global crawler serving all regions or a regional crawler serving a particular region. A bandwidth calculator in the computer 221 calculates the size of the web data fetched by the crawler and enters the size of the web data in the cloud cache 223. Crawling for web data and calculating the size of the web data may be performed continually or in response to an in-the-cloud size query from a mobile computing device 250. As a particular example, the computer 221 may fetch a webpage identified by a URI, calculate the size of the webpage, and enter the size of the webpage along with its URI in the cloud cache 223.

In one embodiment, a regional crawler is selected to respond to an in-the-cloud size query based on the current region and location of the mobile computing device 250. The network module 216 may include the client region and system/browser location in an in-the-cloud size query to allow for selection of the most appropriate regional crawler to fetch and determine the size of the target web data. The cloud computing system 240 (e.g., the computer 224) may also obtain the client region of the mobile computing device 250 by translating its IP address. Use of a regional crawler allows the data size determination to be more accurate as it takes into account differences in language and advertisements that may or may not be present depending on where the URI requester is currently located. As can be appreciated, a regional crawler is not necessary. For example, a global crawler may also be used to retrieve web data and determine the size of the web data with minimal or no penalty because most web data sources on the Internet are not location aware.

The cloud cache 223 serves as a remote data store of size information of web data. The cloud cache 223 may be populated with size information obtained by real time crawling or from the result of in-the-cloud size queries from a plurality of different mobile computing devices 250. The cloud cache 223 may also be populated by web data size calculations performed by a web classify server hosted in a computer 222. In one embodiment, the web classify server provides a web reputation service, such as the web reputation service provided by Trend Micro, Inc. As part of its normal function, a web reputation service has access to webpages for classification. A web reputation service may access a webpage in response to a request for web reputation, or may consult the cloud cache 223 or ask a crawler to retrieve a webpage. A web reputation service in accordance with an embodiment of the present invention takes advantage of these features of web reputation services by including a bandwidth calculator for calculating the size of a fetched webpage and entering the size and URI of the fetched webpage into the cloud cache 223.

The computer 224 hosts a URI size query server for receiving an in-the-cloud size query from a mobile computing device 250 and responding to the in-the-cloud size query by consulting the cloud cache 223 or requesting the computer 221 to perform real time crawling to fetch and size the target web data. Because most websites in the Web 2.0 era have dynamic page content, simply having a static database of URI to webpage size mapping is not recommended for the sake of accuracy. Accordingly, the URI size query server is configured to consult the cloud cache 223, which potentially has current size information, or ask a crawler to obtain and size the webpage to get the most recent webpage size information of a URI.

FIG. 2 schematically shows the system 200 when the mobile computing device 250 is operating in unlimited data plan mode, which is also referred to as "Wi-Fi mode" as it is an operating mode where the mobile computing device 250 typically employs Wi-Fi wireless computer network to access web data. In the example of FIG. 2, the mobile computing device 250 access web data identified by a target URI and hosted by the computer 220.

Bandwidth consumption is not a concern in unlimited data plan mode as no roaming fees are incurred. Accordingly, in unlimited data plan mode, the roaming bandwidth advisor 210 does not hold URI requests. Instead, the roaming bandwidth advisor 210 monitors bandwidth consumption of particular applications to get size information of web data received in the mobile computing device 250. More particularly, in unlimited data plan mode, the network module 216 connects to the target URI indicated in the URI request to request the web data targeted by the URI request (arrow 201) and to receive the web data (arrow 202). For web data requested by an expected size application, such as the expected application 251 (e.g., web browser) running on the mobile computing device 250, the bandwidth calculator 211 calculates the size of the web data (e.g., webpage) and enters the data size information of the web data along with its URI into the local cache 212.

When the application making the URI request is a variable size application, such as the variable size application 252 (e.g., streaming media client), the network module 216 still forwards the URI request (arrow 201) to allow the web data to be received in the mobile computing device 250 (arrow 202). The application heuristic learning module 215 records network bandwidth consumed by receiving web data for the variable size application, calculates statics of the bandwidth consumption, and stores the statistics for the variable size application in the local cache 212 or another data store employed by the application heuristic learning module 215. The statistics may include the peak, mean, and standard deviation of bandwidth consumption of using the variable size application.

The cloud computing system 240 typically does not collaborate with the roaming bandwidth advisor 210 when the mobile computing device 250 is operating in unlimited data plan mode, hence the URI size query server hosted by the computer 224 is not involved in unlimited data plan mode. However, the cloud computing system 240 may continually crawl (arrow 204) to receive webpages (arrow 205), and calculate the size of the webpages for inclusion into the cloud cache 223 (arrow 206). The cloud cache 223 may also continually receive size information of webpages from the computer 222 (arrow 203).

FIG. 3 schematically shows the system 200 when the mobile computing device 250 is operating in roaming mode. The components shown in FIG. 3 have been explained with reference to FIG. 2. In the example of FIG. 3, the mobile computing device 250 tries to access target web data identified by a target URI and hosted by the computer 220.

Figure 4:
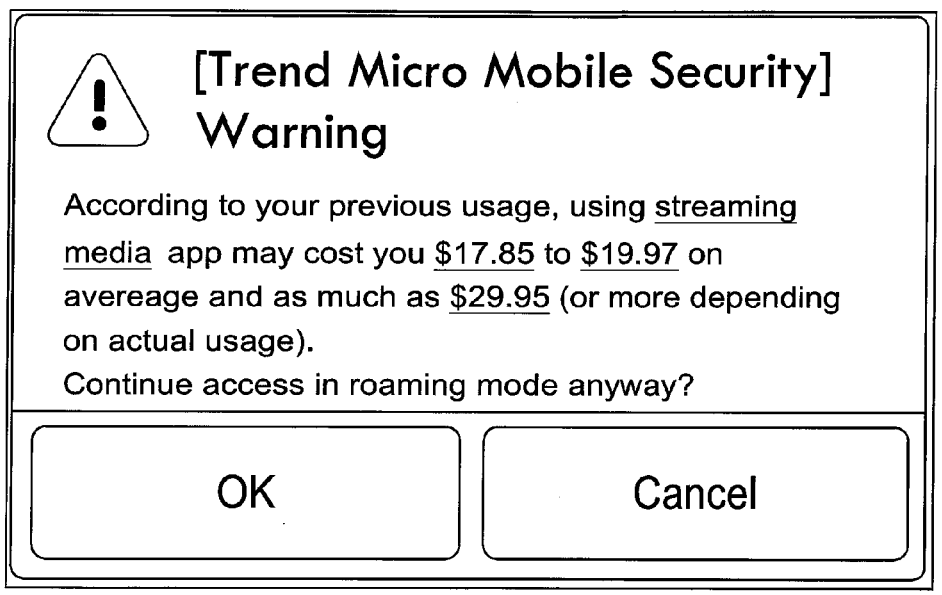
FIGS. 4-7 show user interfaces that may be displayed on a mobile computing device to display roaming fee information in accordance with an embodiment of the present invention.

In roaming mode, the network module 216 intercepts and holds URI requests to receive web data. When the URI request is from a variable size application, such as the variable size application 252, the application heuristic learning module 215 tries to find statistical information for the variable size application based on previous usage of the variable size application. When the variable size application has corresponding statistical information, the application heuristic learning module 215 provides the statistical information to the user along with corresponding roaming fee calculation if the roaming rate is available from the URI query rule set 214. FIG. 4 shows an example user interface 290 that the application heuristic learning module 215 may display on the screen of the mobile computing device 250 when statistical information is available for the target URI. The user may click on the OK button when the user wants to proceed even after being presented with the predicted roaming fee. When the user gives the indication to proceed, the network module 216 forwards the URI request to the computer 220 (FIG. 3, arrow 237), allowing the mobile computing device 250 to receive the target web data (FIG. 3, arrow 238).

When the URI request is from an expected size application, such as the expected size application 251, the network module 216 extracts the target URI from the URI request and consults the white/black lists in the URI query rule set 214. If the target URI matches a URI in the white list, the network module 216 automatically forwards the URI request to the computer 220 without consulting with the user. If the target URI matches a URI in the black list, the network module 216 automatically blocks the URI request without consulting with the user.

Figure 5:
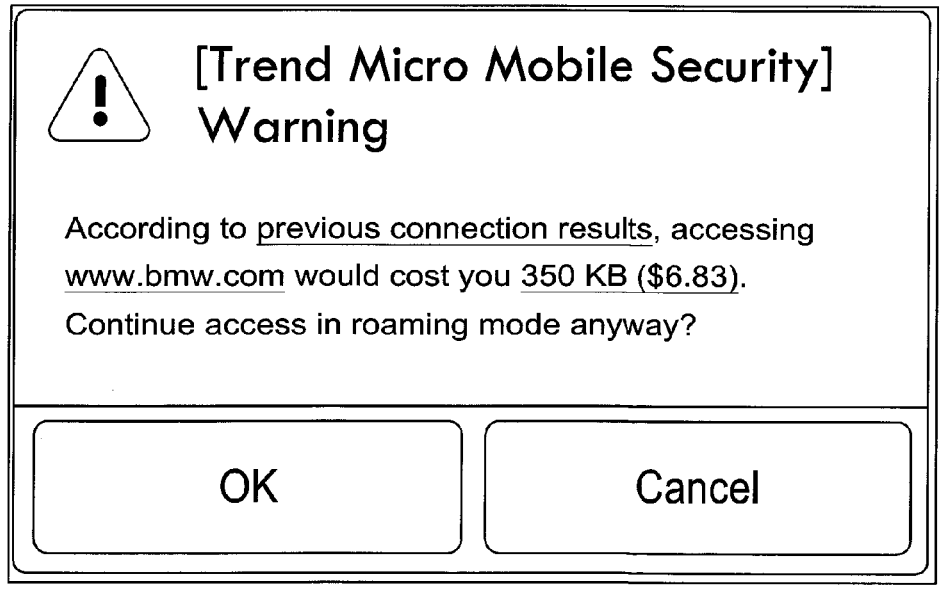

When the target URI is not in a white list or black list, the size of the target web data is determined based on the preferred size lookup strategy indicated in the URI query rule set 214. When the size lookup strategy is to consult the local cache only, the network module 216 consults the local cache 212 for size information of the target web data. If size information of the target web data is available from the local cache 212, the network module 216 may provide the user the size information, corresponding roaming fee calculation, or both. FIG. 5 shows an example user interface 291 that the network module 216 may display on the screen of the mobile computing device 250 when the target web data has size information available in the local cache 212. The user may click on the OK button when the user wants to proceed even after being presented with the potential roaming fee for receiving the target web data. When the user gives the indication to proceed, the network module 216 forwards the URI request to the computer 220 (arrow 237), allowing the mobile computing device 250 to receive the target web data (arrow 238).

When the size lookup strategy indicated in the URI query rule set 214 is to consult the cloud cache and/or real time crawling, the network module 216 prepares and sends an in-the-cloud size query to the cloud computing system 240. The in-the-cloud size query may include, among other information, the target URI, client region, system/browser location, user agent information, and preferred size lookup strategy. In the example of FIG. 3, the in-the-cloud size query is received by the URI size query server hosted by the computer 224 (arrow 231).

In one embodiment, the computer 224 is configured to extract the target URI and the preferred size lookup strategy from the in-the-cloud size query. When the preferred size lookup strategy is to consult the cloud cache 223, the computer 224 consults the cloud cache 223 for size information of the target web data identified by the target URI (arrow 232). When the target web data has size information in the cloud cache 223, the computer 224 retrieves the size information from the cloud cache 223 and provides the size information to the network module 216 (arrow 231). Similarly, when the preferred size lookup strategy is to perform real time crawling, the computer 224 forwards the target URI to a computer 221 for crawling. The computer 224 may extract the client region and system/browser location from the in-the-cloud size query to select and locate a corresponding regional computer 221, when available. In other embodiments, the computer 224 simply forwards the target URI to a global computer 221. The computer 221 crawls to the target URI (arrow 233) to retrieve the target web data (arrow 234), determines the size of the target web data, and provides the size information of the target web data along with the target URI in the cloud cache 223 (arrow 235). The computer 221 also provides the size information of the target web data to the computer 224, which forwards the size information of the target web data to the network module 216 (arrow 231).

Figure 6:
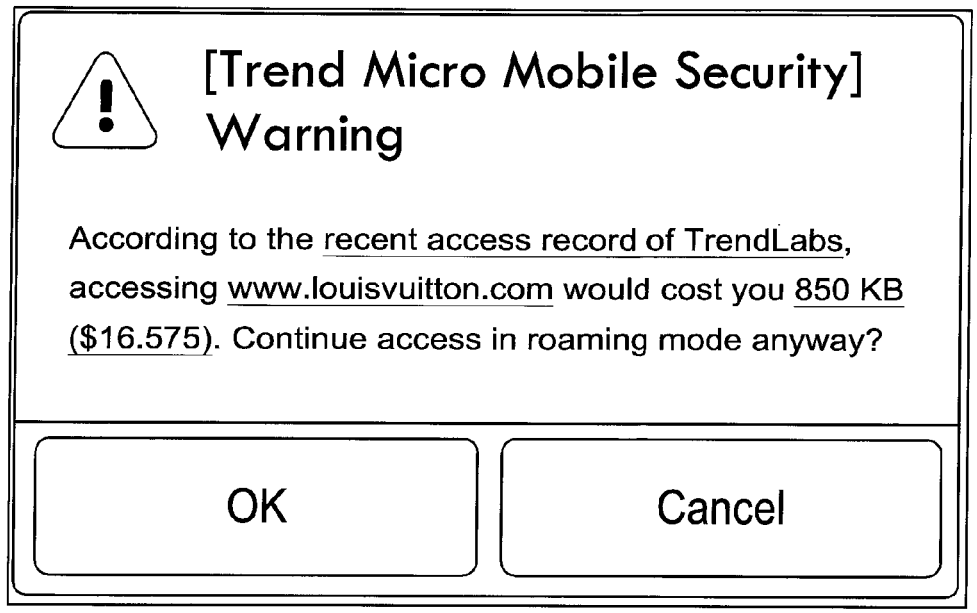

When the in-the-cloud size query is successful, i.e., the cloud computing system 240 has size information for the target web data either by consulting the cloud cache 223 or by real time crawling, the network module 216 receives the size information from the computer 224. The network module 216 provides the size information and/or corresponding roaming fee calculation if the roaming rate is available from the URI query rule set 214. FIG. 6 shows an example user interface 292 that the network module 216 may display on the screen of the mobile computing device 250 when the in-the-cloud size query is successful. In the example of FIG. 6, the cloud computing system 240 is operated by TrendLabs™ antivirus research center. The user may click on the OK button of the user interface 292 when the user wants to proceed even after being presented with the size information and/or corresponding roaming fee. When the user gives the indication to proceed, the network module 216 forwards the URI request to the computer 220 (arrow 237), allowing the mobile computing device 250 to receive the target web data (arrow 238).

Figure 7:

When the in-the-cloud size query is not successful, i.e., the cloud computing system 240 has no size information for the target web data, the computer 224 so informs the network module 216. FIG. 7 shows an example user interface 293 that the network module 216 may display on the screen of the mobile computing device 250 when the cloud computing system 240 and/or the local cache 212 has no size information for the target web data. In the example of FIG. 7, the cloud computing system 240 is operated by TrendLabs™ antivirus research center. The user may click on the OK button of the user interface 293 when the user wants to proceed even when there is no size information for the target web data. When the user gives the indication to proceed anyway, the network module 216 forwards the URI request to the computer 220 (arrow 237), allowing the mobile computing device 250 to receive the target web data (arrow 238).

Figure 8:
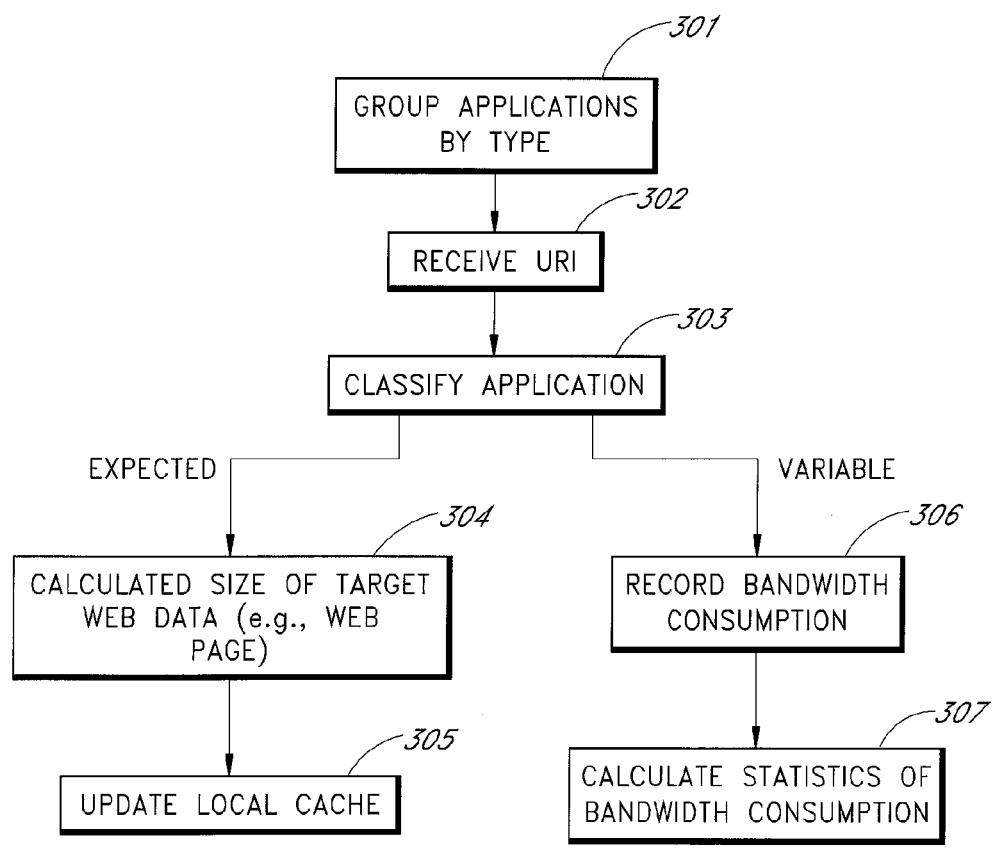
FIGS. 8 and 9 show flow diagrams of a computer-implemented method of providing roaming bandwidth guidance for mobile computing devices in accordance with an embodiment of the present invention.
Figure 9:
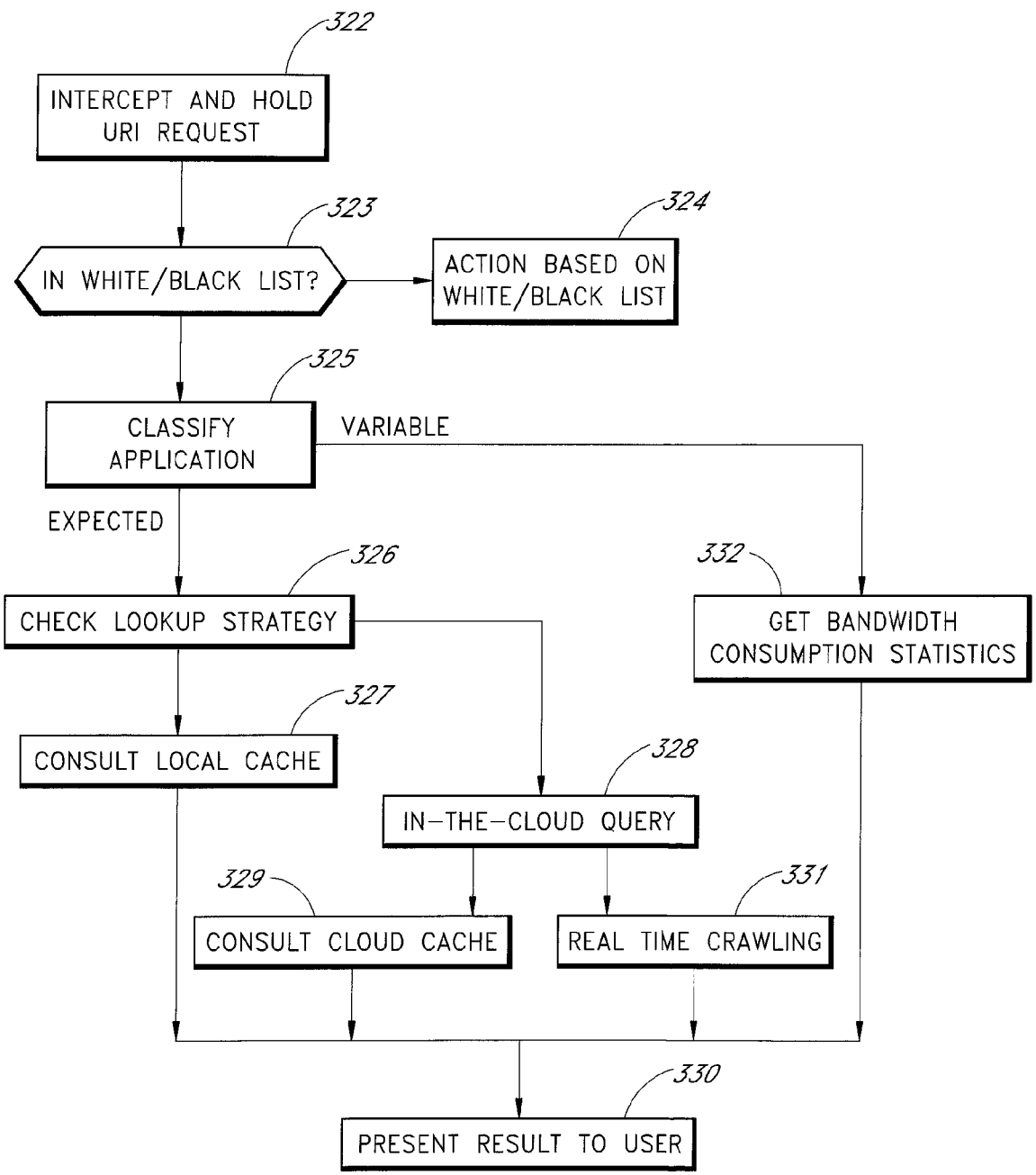

FIGS. 8 and 9 show flow diagrams of a computer-implemented method of providing roaming bandwidth guidance for mobile computing devices in accordance with an embodiment of the present invention. The method of FIGS. 8 and 9 are explained using the components of the system 200 (see FIGS. 2 and 3) for illustration purposes only. Other components may also be employed without detracting from the merits of the present invention.

The method FIG. 8 is performed by a mobile computing device 250 that operates in unlimited data plan mode. In the example of FIG. 8, the applications running on a mobile computing device 250 are grouped into at least two types (step 301). In this example, the applications are grouped into two classifications, namely expected size applications and variable size applications. In one embodiment, a web browser is classified as an expected size application and streaming media (e.g., video, online gaming) applications are classified as variable size applications. The classifications of applications may be indicated in a URI query rule set 214.

A network module 216 of the mobile computing device 250 receives a target URI when the mobile computing device 250 is operating in unlimited data plan mode as indicated by a mode sensor 213 (step 302). The target URI may be extracted from a URI request. The network module 216 determines the classification of the application requesting to connect to the target URI (step 303).

When the application requesting to connect to the target URI is an expected size application (step 303 to step 304), the network module 216 retrieves the target web data identified by the target URI. A bandwidth calculator 211 calculates the size of the target web data (arrow 304) and stores the size information of the target web data along with the target URI in a local cache 212 (arrow 305). As a particular example, the target URI may be a URL of a webpage. In that case, the network module 216 retrieves the webpage. The bandwidth calculator 211 calculates the size of the webpage and updates the local cache 212 with the size of the webpage along with its URL.

When the application requesting to connect to the target URI is a variable size application (step 303 to step 306), the network module 216 connects to the target URI to receive the target web data. The application heuristic learning module 215 monitors and records the bandwidth consumption of the variable size application (step 306). The application heuristic learning module 215 calculates statistics of the bandwidth consumption of the variable size application (step 307). As a particular example, the target URI may be the URL of streaming media. In that case, the network module 216 accesses the streaming media by its URL. The application heuristic learning module 215 records streaming of the media to the variable size application and calculates statistics of the streaming. The statistics may include the peak, mean, and standard deviation of the amount of data downloaded to the mobile computing device 250 as a result of the streaming.

The method of FIG. 8 advantageously allows for gathering data size and actual/realistic bandwidth consumption information during times when the mobile computing device 250 is not incurring roaming fees. Information gathered by the method of FIG. 8 may be used to provide roaming bandwidth guidance to the user when the mobile computing device 250 is subsequently used in roaming mode.

The method FIG. 9 is performed by the mobile computing device 250 in collaboration with the cloud computing system 240 when the mobile computing device 250 is operating in roaming mode. In roaming mode, the network module 216 intercepts and holds URI requests submitted by applications running on the mobile computing device 250 (step 322). The network module 216 extracts a target URI from a URI request and determines if the target URI is included in a white list or black list. If so (step 323 to step 324), the network module 216 performs an action in accordance with the white list or black list without further processing the URI request to determine the size of the target web data (step 324). In one embodiment, the network module 216 automatically allows the URI request to proceed when the target URI is in a white list, and automatically blocks the URI request when the target URI is in a black list.

The network module 216 classifies the application that initiated the URI request when the target URI is not in a white list or black list (step 323 to step 325). When the URI request is from an expected size application 251, the network module 216 extracts the preferred size lookup strategy from the URI request (step 325 to step 326). The network module 216 consults the local cache 212 if the preferred size lookup strategy is to consult the local cache 212 (step 326 to step 327) or performs an in-the-cloud size query (step 326 to step 328) if the preferred size lookup strategy is to consult the cloud cache 223 (step 328 to step 329) or to perform real time crawling (step 328 to step 331).

When the URI request is from a variable size application 252 (step 325 to step 332), the application heuristic learning module 215 retrieves statistical information for the variable size application 252 based on previous usage history step 332).

Roaming fee information associated with receiving the target web data in the mobile computing device 250, such as the size of the target web data and/or corresponding roaming fee, is presented to the user before the URI request is sent out of the mobile computing device. More particularly, the result of consulting the local cache 212, consulting the cloud cache 223, real time crawling, or retrieval of bandwidth consumption statistics is presented to the user, e.g., by displaying the result on the screen of the mobile computing device 250 (step 330). The result may indicate expected or predicted size information of target web data and/or corresponding roaming fee when size information for the target web data is available. Otherwise, the result may simply indicate that size information is not available for the target web data. The network module 216 may forward the URI request out of the mobile computing device when the user indicates that he or she wants to proceed with accessing the target web data even after being presented with the result.

Methods and apparatus for providing roaming bandwidth guidance for mobile computing devices have been disclosed.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method, the method comprising:
   intercepting and holding a uniform resource identifier (URI) request for target web data sent by an application program in a mobile computing device operating in roaming mode, the URI request including a target URI that identifies the target web data available over a computer network;
   determining a classification of the application program that sent the URI request;
   after intercepting and holding the URI request but before sending the URI request out of the mobile computing device, determining network bandwidth consumption associated with receiving the target web data in the mobile computing device based on the classification of the application program that sent the URI request; and
   before sending the URI request out of the mobile computing device, displaying on a screen of the mobile computing device roaming fee information for receiving the target web data into the mobile computing device based on the network bandwidth consumption associated with receiving the target web data.

2. The method of claim 1 wherein the roaming fee information comprises a size of the target web data.

3. The method of claim 1 wherein the roaming fee information comprises a roaming fee to be incurred by receiving the target web data into the mobile computing device.

4. The method of claim 1 further comprising:
   calculating a statistic of a previous usage history of the application program that sent the URI request.

5. The method of claim 1 further comprising:
   after displaying on the screen of the mobile computing device the roaming fee information for receiving the target web data into the mobile computing device, receiving an indication to proceed with the URI request; and
   in response to receiving the indication to proceed with the URI request, sending the URI request out of the mobile computing device.

6. The method of claim 1 wherein determining the network bandwidth consumption associated with receiving the target web data in the mobile computing device comprises:
   consulting a local cache locally available in the mobile computing device for information on size of the target web data.

7. The method of claim 1 wherein determining the network bandwidth consumption associated with receiving the target web data in the mobile computing device comprises:
   consulting a cloud cache remotely located from the mobile computing device for information on size of the target web data.

8. The method of claim 1 wherein determining the network bandwidth consumption associated with receiving the target web data in the mobile computing device comprises:
   retrieving the target web data into a computer separate from the mobile computing device;
   determining the size of the retrieved target web data; and
   receiving the size of the retrieved target web data in the mobile computing device.

9. The method of claim 1 wherein the target web data comprises a webpage.

10. The method of claim 1 wherein the URI comprises a uniform resource locator (URL).

11. The method of claim 1 wherein the roaming fee information comprises a size of the target web data, and the size of the target web data is received by the mobile computing device from a computer separate from the mobile computing device.

12. A computer-implemented method, the method comprising:
- intercepting and holding a request for a webpage sent by an application program in a mobile computing device;
- determining whether the application program that sent the request for the webpage is classified as an expected size program that downloads data of an expected data size or classified as a variable size program that downloads data of varying sizes depending on usage;
- in response to receiving the request for the webpage and finding that the application program that sent the request for the webpage is classified as an expected size program, determining a size of the webpage; and
- before sending the request for the webpage out of the mobile computing device, displaying on a screen of the mobile computing device information relating to a fee for receiving the webpage in the mobile computing device, the information relating to the fee being based on the size of the webpage.

13. The method of claim 12 wherein determining the size of the webpage comprises:
- sending an in-the-cloud size query from the mobile computing device to a cloud computing system; and
- receiving a result of the in-the-cloud size query in the mobile computing device, the result indicating the size of the webpage.

14. The method of claim 12 wherein determining the size of the webpage comprises:
- consulting a local cache for the size of the webpage.

15. The method of claim 12 wherein determining the size of the webpage comprises:
- consulting a remotely located cache for the size of the webpage.

16. The method of claim 12 wherein determining the size of the webpage comprises:
- retrieving the webpage into a computer separate from the mobile computing device;
- calculating a size of the webpage retrieved by the computer; and
- providing the size of the webpage retrieved by the computer to the mobile computing device.

* * * * *